(12) United States Patent
Maus et al.

(10) Patent No.: US 11,214,257 B2
(45) Date of Patent: Jan. 4, 2022

(54) VEHICLE OPERATION ON AN ON-RAMP

(71) Applicant: Ford Global Technologies, LLC, Dearborn, MI (US)

(72) Inventors: Benjamin Maus, Düsseldorf (DE); Guido Weitkus, Koeln/NRW (DE); Andreas Meyer, Kuerten/NRW (DE); Peter W. A. Zegelaar, Heerlen (NL); Christoph Schlaug, Ingelbach/Rheinland-Pfalz (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 145 days.

(21) Appl. No.: 16/253,491

(22) Filed: Jan. 22, 2019

(65) Prior Publication Data
US 2019/0241187 A1    Aug. 8, 2019

(30) Foreign Application Priority Data
Feb. 7, 2018   (DE) .......................... 102018201896.0

(51) Int. Cl.
*B60W 30/18*   (2012.01)
*B60W 40/072*   (2012.01)
(Continued)

(52) U.S. Cl.
CPC .... *B60W 30/18163* (2013.01); *B60W 30/143* (2013.01); *B60W 40/072* (2013.01);
(Continued)

(58) Field of Classification Search
None
See application file for complete search history.

(56) References Cited

U.S. PATENT DOCUMENTS 7,260,465 B2    8/2007   Waldis et al.
8,583,341 B2 *  11/2013  Stahlin ............. G08G 1/096725
                                                            701/75
(Continued)

FOREIGN PATENT DOCUMENTS

WO    2016173717 A1    11/2016

OTHER PUBLICATIONS

Yang et al., "Homing Guidance of On-Ramp Vehicles for Safe Merging", American Control Conference, 1992.
(Continued)

*Primary Examiner* — Aniss Chad
*Assistant Examiner* — Mahmoud M Kazimi
(74) *Attorney, Agent, or Firm* — Frank A. MacKenzie; Bejin Bieneman PLC (57) ABSTRACT

It is determined that (a) a first vehicle is driving on a curve on a first road or, (b) by detecting a second road, a road boundary of the first road. It is further determined that there is (c) parallel traffic by determining that a second vehicle is moving in a lane of the second road adjacent to the first road, or (d) tangential traffic by detecting a third vehicle is moving tangentially to the curve. Upon determining that there is simultaneously at least one of (a) the first vehicle driving on the curve on the first road or (b) the road boundary of the first road, and at least one of (c) parallel traffic or (d) tangential traffic, then it is determined that the first vehicle is driving on an on-ramp.

15 Claims, 5 Drawing Sheets

(51) Int. Cl.
*G06K 9/00* (2006.01)
*B60W 30/14* (2006.01)
*B60W 30/10* (2006.01)
*B60W 40/04* (2006.01)
*B60W 40/114* (2012.01)
*B60W 50/14* (2020.01)

(52) U.S. Cl.
CPC . *G06K 9/00798* (2013.01); *B60W 2554/4041* (2020.02); *B60W 2554/801* (2020.02)

(56) References Cited

U.S. PATENT DOCUMENTS

| | | | |
|---|---|---|---|
| 9,387,878 | B2 | 7/2016 | Mulder et al. |
| 9,463,796 | B2 | 10/2016 | Kaminade et al. |
| 9,767,686 | B2 * | 9/2017 | Jeschke .............. G01C 21/3697 |
| 2008/0027607 | A1 | 1/2008 | Ertl et al. |
| 2010/0030472 | A1 | 2/2010 | Kindo et al. |
| 2012/0283942 | A1 * | 11/2012 | T'Siobbel .............. G01C 21/26 701/410 |
| 2013/0110371 | A1 * | 5/2013 | Ogawa ............... G08G 1/09623 701/70 |
| 2015/0025706 | A1 * | 1/2015 | Roth ..................... B60W 30/16 701/1 |
| 2015/0100216 | A1 * | 4/2015 | Rayes ................. B60W 30/143 701/96 |

OTHER PUBLICATIONS

Glaser et al., "Maneuver-Based Trajectory Planning for Highly Autonomous Vehicles on Real Road With Traffic and Driver Interaction", IEEE Transactions on Intelligent Transportation Systems, vol. 11, Issue: 3, Sep. 2010.

* cited by examiner

VEHICLE OPERATION ON AN ON-RAMP

CROSS-REFERENCE TO RELATED APPLICATIONS

This patent application claims priority to German Application No. DE 102018201896.0 filed on Feb. 7, 2018, which is hereby incorporated by reference in its entirety.

BACKGROUND

Driver assistance systems assist the driver in order to improve driving comfort and safety when driving. In this case, the properties of the respective vehicle environment are important input variables for individual available functions. In connection with driver assistance systems, in particular advanced driver assistance systems (ADAS), features or properties of the road and the environment may be a reason to adapt the respective ADAS function to the features of the road or the environment with respect to an upcoming maneuver.

For example, the functionality of a lane change assistant could be changed if the driver wishes to move into a narrow gap, to be precise depending on whether or not the driver is on a freeway on-ramp. If driving on a freeway on-ramp, the driver and also all other drivers are aware that the affected driver must change lanes in order to drive onto the freeway. Therefore, drivers already on the freeway will provide the gap required for the lane change. The driver can therefore also use a narrow gap to move into provided that the size of the gap is sufficient. In order to avoid misunderstandings or contradictory actions of the lane change assistant when driving onto a freeway, it is therefore advantageous to accordingly adapt the functionality of the lane change assistant in such a case. The information required for the adaptation can be obtained from an electronic horizon (EH). However, this results in increased costs.

The documents U.S. Pat. No. 7,260,465 B2 and WO 2016 173717 A1 describe methods for regulating the speed of a vehicle using a cruise control for controlling the speed, wherein a lane change to an off-ramp is detected and the speed of the vehicle is accordingly adapted. The document US 2012 0283942 A1 discloses a navigation system which, for a lane change, in particular in connection with the process of driving onto a freeway, determines the positions and the speed of other vehicles and displays a speed recommended for merging to the driver.

SUMMARY

Against the described background, an advantageous method is provided for determining the driving of a vehicle on a first road which is an on-ramp to a second road. Also provided is an advantageous driver assistance method during a lane change for a vehicle and an apparatus for determining the driving of a vehicle on a first road which is an on-ramp to a second road, and a lane change assistance apparatus for a vehicle.

The method for determining the driving of a first vehicle on a first road which is an on-ramp to a second road comprises the following steps: it is determined whether the vehicle is driving on a bend or curve. It is also determined whether an end of a road boundary of the road being driven on by the first vehicle from the second road is present. The end of a road boundary can be detected, in particular. It is also determined whether there is parallel traffic by determining whether at least one second vehicle is moving along in a lane of the second road adjacent to the road currently being driven on by the first vehicle in the direction of travel of the first vehicle. In a further step, it is determined whether there is tangential traffic by determining whether at least one second vehicle is moving along in a manner tangential to a curve currently being driven on by the first vehicle. It is determined that the first vehicle is driving on an on-ramp if the driving of the first vehicle on a curve or the end of a road boundary has been determined and it has been simultaneously determined that there is parallel or tangential traffic.

In one variant, it is determined that the first vehicle is driving on an on-ramp if the driving of the first vehicle on a curve was determined at a first time and it was simultaneously determined that there is tangential traffic and the end of a road boundary was determined at a second time and it was simultaneously determined that there is parallel traffic.

The present method has the advantage that only sensors present in the vehicle, in particular sensors provided for existing driver assistance systems, can be used to determine whether the vehicle is on an on-ramp. This avoids additional costs for adapting driver assistance systems, in particular for adapting a lane change assistance system, to the situation when driving onto another road.

The second road may be, for example, a multilane road, in particular an expressway or a freeway. The second road may also be distinguished by the fact that it must be driven on at a stipulated minimum speed and/or can only be driven on at a maximum speed above 50 km/h, in particular above 80 km/h.

It can be advantageously determined whether the first vehicle is driving on a right-hand curve, that is to say a curve to the right, in the case of right-hand traffic or is driving on a left-hand curve, that is to say a curve to the left, in the case of left-hand traffic. This has the advantage that, by distinguishing between right-hand traffic and left-hand traffic, it is possible to exclude curves which typically do not characterize the driving on an on-ramp. In the case of right-hand traffic, on-ramps are typically characterized by a right-hand curve, whereas on-ramps are typically characterized by a left-hand curve in the case of left-hand traffic. An exception to this is the situation in which the on-ramp is preceded by a bridge over the second road or an underpass under the second road. It is likewise possible to accordingly adapt the method according to the invention to such a situation by additionally taking into account the grade of the road being driven on, for example.

It can be determined that the first vehicle is driving on an on-ramp if a first road boundary of the first road and a second road boundary of the second road have been determined, wherein the first road boundary and the second road boundary enclose an acute angle at the end of the first road boundary in a plan view. Since an on-ramp typically runs at an acute angle to the second road shortly before a first road joins a second road, the road boundaries used, for example, guardrails, also have the form of an acute angle, in a plan view, immediately before the transition of the on-ramp to a region in which a lane change to the second road is possible. Detecting the road boundaries when both lanes or both roads join is therefore a suitable indicator for determining the driving on an on-ramp. This has the advantage that it can be detected in a comparatively simple and reliable manner.

The presence of parallel and/or tangential traffic can be advantageously detected using at least one optical or visual sensor. The use of such a sensor has the advantage that it is typically already present in the vehicle and the corresponding detection can therefore be implemented without any additional outlay.

Tangential traffic can be determined, in particular detected, for example, by determining the angle between the current or instantaneous direction of movement of the first vehicle and the current or instantaneous direction of movement of the at least one second vehicle, and it is determined or assumed that there is tangential traffic if this angle decreases. As a further criterion, it can be assumed that the angle decreases constantly or continuously or that the angle decreases in the direction of 0 degrees or down to 0 degrees. when determining the angle, vectors which indicate the direction of movement of the first vehicle and the at least one second vehicle, for example speed vectors or position vectors or acceleration vectors, can be used, in particular, and the angle between them can be determined.

In order to determine whether the vehicle is driving on a curve, at least one road boundary of the road being driven on by the first vehicle in the form of a guardrail and/or an edge of the road is detected in one advantageous variant and the curvature angle of the guardrail and/or of the edge of the road is determined. Since guardrails as a road boundary typically represent the course of the curve and, in particular, the curvature of the road, they are advantageously suitable for determining the course of the road. They are therefore particularly suitable for determining whether there is a curve. Additionally or alternatively, the edge of the road can be detected using a camera, in particular. In this case, the transition from asphalt to grass and/or earth and/or gravel can be detected, for example.

The end of the curve or the end of the road boundary can be determined and a driver assistance function, for example a lane change assistance function or a speed control function, of the first vehicle can be activated and/or carried out when the first vehicle reaches the end of the road boundary. This has the advantage that the functionality of the assistance function can be adapted to the specific situation of driving onto a second road and, in particular, can be modified depending on the situation.

The driver assistance method according to the invention during a lane change for a vehicle is distinguished by the fact that the driving of a first vehicle on an on-ramp is determined as described above and at least one assistance function is adapted to a lane change to a lane of the second road. The second road may be, for example, a multilane road, for example an expressway or a freeway. The assistance function can be adapted to the situation and the requirements when driving onto the second road, in particular a multilane road. In particular, the recommended speed and/or the size of a gap needed for merging between two vehicles driving behind one another in a lane of the second road adjacent to the first road and/or at least one prerequisite for outputting a warning signal to the driver of the first vehicle can be adapted. For example, depending on the traffic and the speed of the vehicles driving on the second road and, in particular, in the adjacent lane, a suitable gap for driving onto the road and a speed required for this purpose can be stipulated and suggested to the driver.

An apparatus for determining the driving of a first vehicle on a first road which is an on-ramp to a second road comprises an apparatus for determining the driving of the first vehicle on a curve, an apparatus for detecting an end of a road boundary of the road being driven on by the first vehicle from a second road and an apparatus for detecting parallel and tangential traffic. The apparatus according to the invention is designed to carry out an above-described method according to the invention for determining the driving on an on-ramp and/or a driver assistance method during a lane change. The apparatus for determining the driving on an on-ramp has the same advantages as the methods described above.

The apparatus for determining the driving of the vehicle on a curve advantageously comprises a yaw rate sensor and/or a sensor for determining the lateral acceleration and/or a steering angle sensor and/or at least one camera and/or a Global Positioning System (GPS). It is possible to determine whether the vehicle is driving on a curve in a quick, reliable and cost-effective manner with the aid of the sensors mentioned.

The lane change assistance apparatus for a vehicle comprises an apparatus described above. It is also designed to carry out an above-described driver assistance method during a lane change for a vehicle. The lane change assistance apparatus has the advantages already mentioned.

The vehicles mentioned may be, in particular, motor vehicles, for example automobiles, trucks, motorcycles or others.

A motor vehicle comprises an above-described apparatus for determining the driving of a vehicle on an on-ramp and/or an above-described lane change assistance apparatus. The motor vehicle may be an automobile or a truck. The motor vehicle disclosed herein has the same features and advantages as the above-described methods and apparatuses. Overall, the present invention improves vehicle safety and driving comfort.

SUMMARY OF THE DRAWINGS

Further features, properties and advantages of the present invention are described in more detail below on the basis of exemplary embodiments with reference to the accompanying figures. All features described above and below are advantageous both individually and in any desired combination with one another. The exemplary embodiments described below are only examples which do not restrict the subject matter of the invention, however.

The figures are not necessarily accurate in every detail and are not true to scale and can be represented in an enlarged or reduced form in order to provide a better overview. Therefore, functional details disclosed here should not be understood as restrictive, but only as a clear basis which provides a person skilled in the art in this field of technology with guidance for using the present invention in various ways.

The expression "and/or" used here, if used in a series of two or more elements, means that each of the elements cited can be used alone or any combination of two or more of the cited elements can be used. If, for example, a composition containing the components A, B and/or C is described, the composition can contain A on its own; B on its own; C on its own; A and B in combination; A and C in combination; B and C in combination; or A, B and C in combination.

DESCRIPTION

Figure 1:
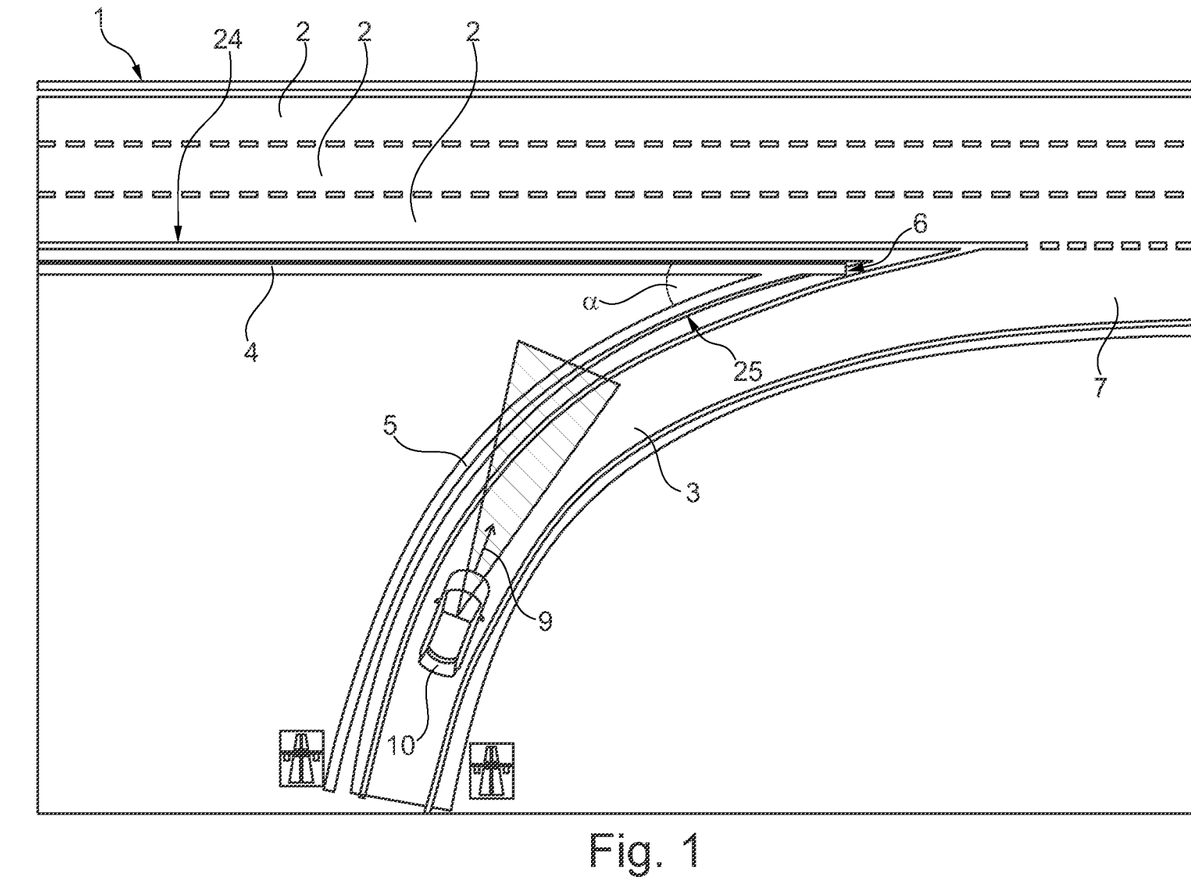
FIG. 1 schematically shows a plan view of a motor vehicle driving on an on-ramp to a freeway.

FIG. 1 schematically shows a plan view of a motor vehicle which is driving on an on-ramp to a freeway. The freeway 1 shown comprises a plurality of lanes 2 in the present exemplary embodiment. The shown on-ramp 3 to the freeway 1 comprises only one lane. As an alternative to the exemplary embodiment shown, the on-ramp 3 may also comprise a plurality of lanes. In the region of the on-ramp 3, the freeway 1 is provided with a road boundary in the form of a guardrail 4. The on-ramp 3 likewise comprises a guardrail 5. The guardrails 4 and 5 meet at the transition of the road 3 into a road region 7 which runs parallel to the lanes 2 of the road 1.

The guardrails 4 and 5 enclose an acute angle α in a plan view in the region in which the guardrails meet 6. The region 7 of the road 3 in which the latter runs parallel to the road 1 constitutes the region in which a vehicle 10 driving on the on-ramp 3 can or must merge into a lane 2 of the road 1. The direction of movement or direction of travel of the vehicle 10 is indicated by an arrow 9.

Right-hand traffic is involved in the example shown. The on-ramp 3 describes a right-hand curve. Freeway on-ramps typically comprise tight curves in order to adapt the direction of the road to the direction of travel of the freeway. The curve, for example a right-hand curve, can be detected with the aid of sensors present in the vehicle 10, for example a yaw rate sensor, a sensor for determining the lateral acceleration or a steering angle sensor. The presence of a typical freeway on-ramp can be inferred on the basis of the curvature and the length of the curve. The curvature of the curve and its length can be used as an indicator for the presence of an on-ramp.

The end 6 of a boundary of the roads 1 and 3, for example as a result of guardrails 4, 5, on the side of the road on which the on-ramp 3 merges into the second road 1, for example the freeway 1, is likewise an indication that the road 3 is an on-ramp. The road boundary 4 or 5 to be considered is typically on the left-hand side of the road 25 of the on-ramp 3 in the case of right-hand traffic and is on the right-hand side of the road 24 of the road 1 which is to be driven onto.

The course of the curve, in particular the curvature radius and/or the curvature angle, of the guardrail 5 can be captured by means of the vehicle 10, in particular by means of sensors present in the vehicle 10, for example optical or visual sensors. In addition, the angle α between the guardrail 4 and the guardrail 5 can be detected. If this angle α decreases, in particular decreases constantly or continuously, in the direction of the end 6 of the road boundary produced by the guardrails 4 and 5, the end of a road boundary can be determined from this.

The end of the course of the curve of the road 3 or the end of the road boundary 6 can be used as an indication of the start of the region in which the vehicle 10 must merge on the road 1 or can indicate this region. If, as in FIG. 1, there is no traffic on the road 1, it is not absolutely necessary to adapt lane change functions or other driver assistance systems to the specific situation of merging on a freeway. As a further criterion, the presence of further vehicles, that is to say at least one second vehicle which is moving along on the road 1, is possible.

Figure 2:
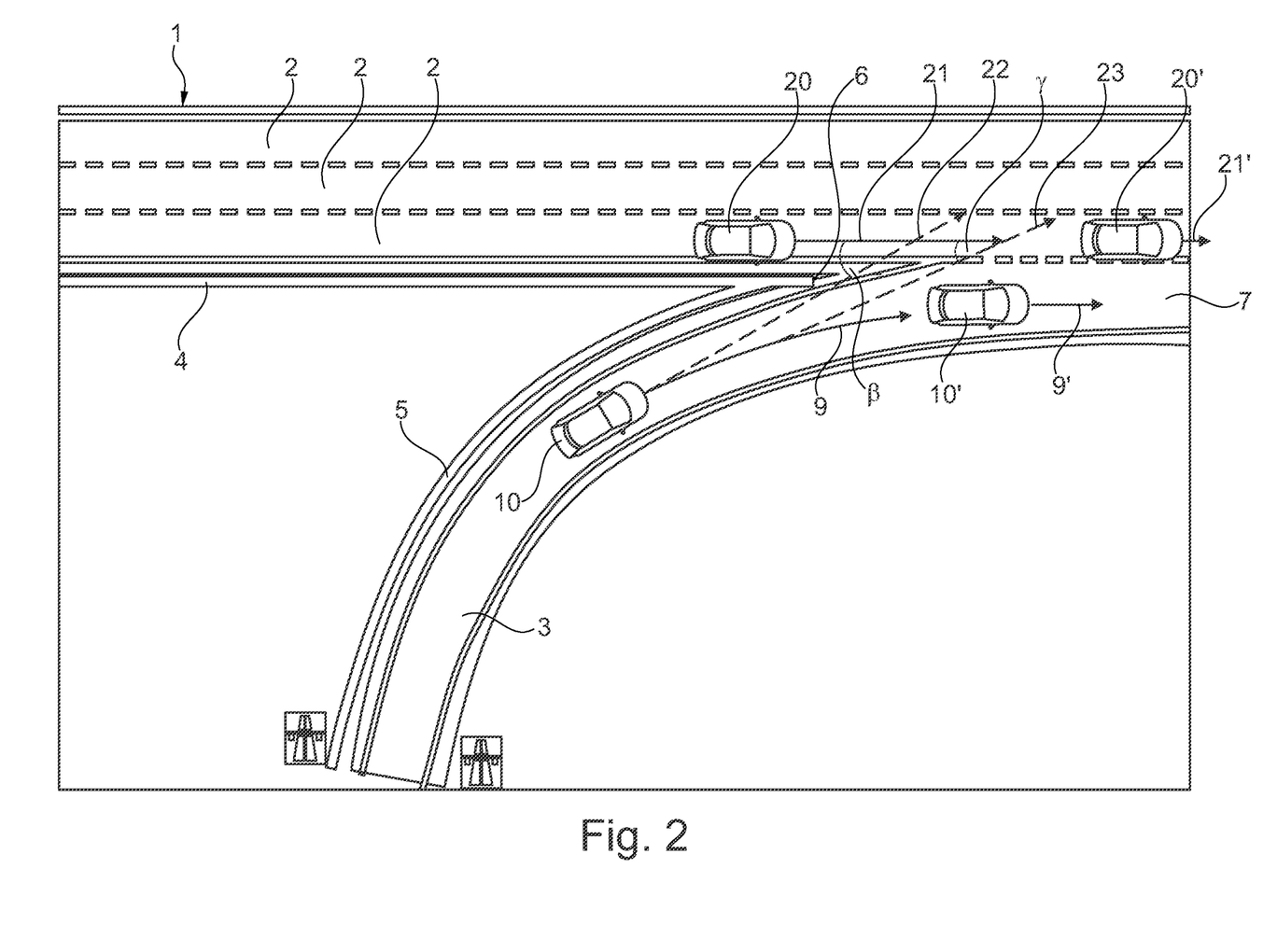
FIG. 2 schematically shows a plan view of the roads shown in FIG. 1.

FIG. 2 schematically shows a plan view of the roads shown in FIG. 1, wherein a second vehicle 20 is moving along on the second road 1 in the direction of travel 21. At a first time, the vehicle 10 is in the region of the curve of the on-ramp 3 and detects whether there is traffic tangential to the curve driven on by it by means of at least one visual detector, for example by means of a camera. In the example shown in FIG. 2, the vehicle 20 is moving on the second road 1 in a tangential manner with respect to the curve which describes the on-ramp 3.

In order to assess whether this is tangential traffic in this sense, the angle between the direction of movement 9 of the vehicle 10 and the direction of movement 21 of a second vehicle 20 is considered. In this case, it is possible to consider a vector which may be a vector indicating the respective direction of movement, or else a corresponding speed and/or acceleration vector. If it is detected that the angle between the vectors decreases, in particular uniformly or constantly converges toward zero, this is used as an indicator of tangential traffic being present.

In FIG. 2, the angle θ with respect to the direction of movement 21 of the vehicle 20 was determined for a first direction of movement 22 of the vehicle 10 and an angle γ with respect to the direction of movement 21 of the vehicle 20 was determined at a later time for a direction of movement 23 of the vehicle 10. The angle γ is less than the angle β.

At an even later time, the vehicle 10 is in the position in which it is indicated by 10' in FIG. 2. At this time, the vehicle 20 is in the position in which it is indicated by 20'. At this time, the vehicle 10' is moving in the direction 9' and the vehicle 20' is moving in the direction 21', each indicated by arrows. In this case, the vehicle 10' determines that there is parallel traffic by means of corresponding sensors, for example by means of a visual sensor, in particular by means of a camera. Parallel traffic is considered to be present if objects, in particular other vehicles, for example motor vehicles, motorcycles or trucks, which are moving along in a direction parallel to the direction of travel 9' of the first vehicle 10' are detected in one of the adjacent lanes 2.

It is determined that the first vehicle 10 is on an on-ramp 3 if the driving on a curve or the end of a road boundary 4, 5, 6 has been determined and parallel traffic or tangential traffic is simultaneously present.

Figure 3:
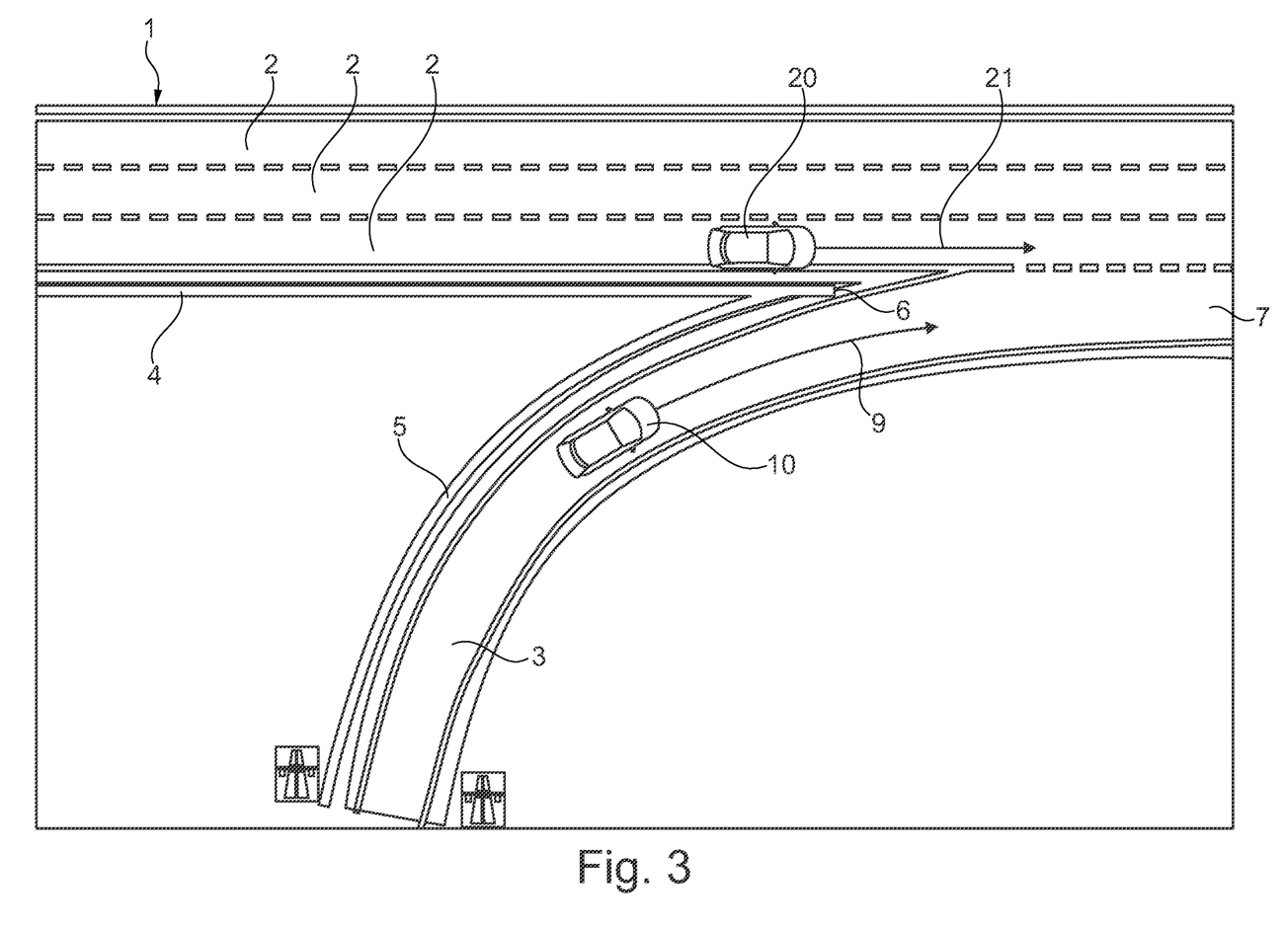
FIG. 3 schematically shows a plan view of the roads shown in FIG. 2 at a first time.
Figure 4:
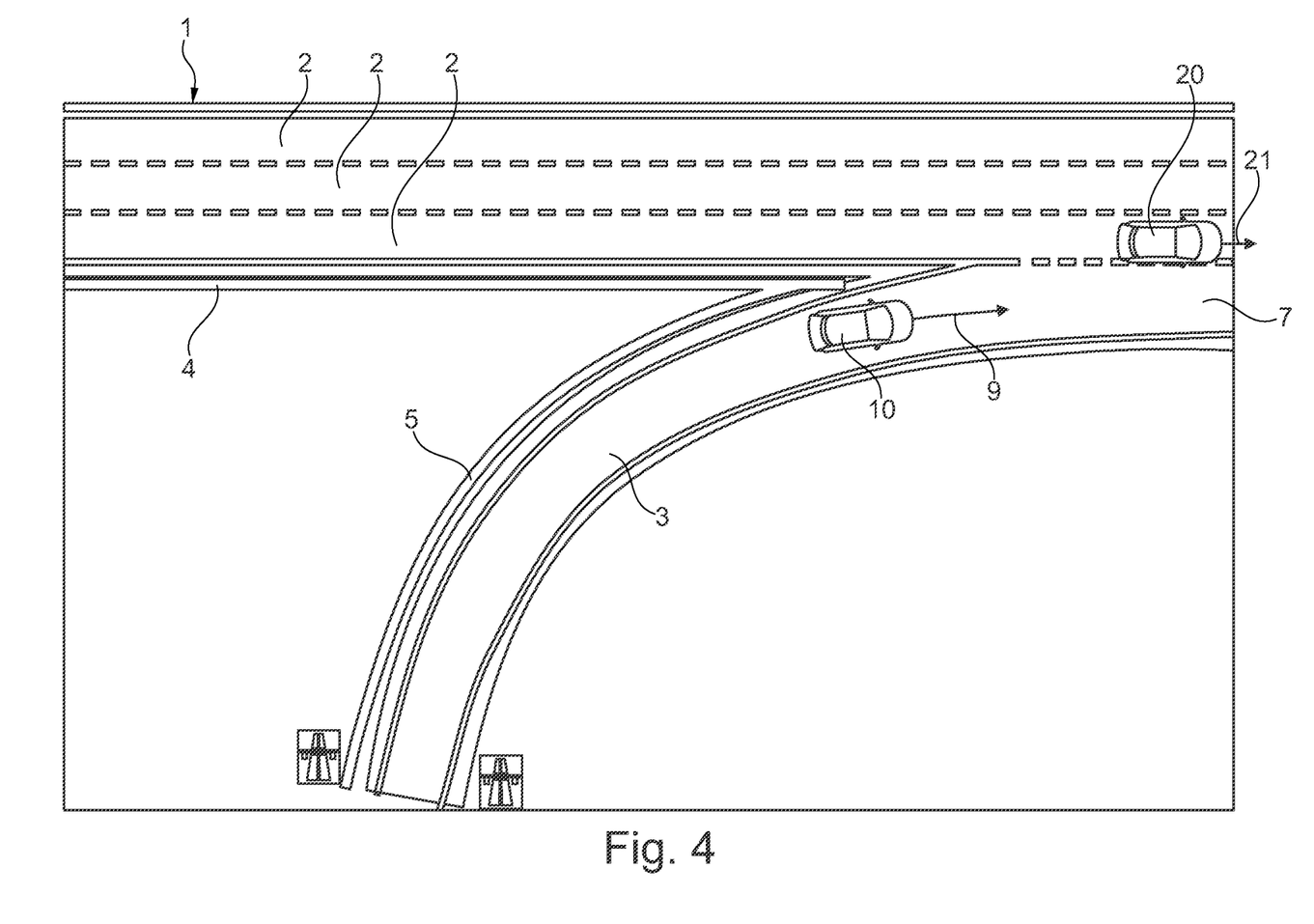
FIG. 4 schematically shows a plan view of the roads shown in FIG. 2 at a second time.

FIG. 3 shows the situation in which the driving on a curve has been determined by the vehicle 10 and tangential traffic has simultaneously been detected as present. In the example shown in FIG. 4, the vehicle 10 determined the end of a boundary of a road 6 and the presence of parallel traffic was simultaneously detected or determined.

Figure 5:
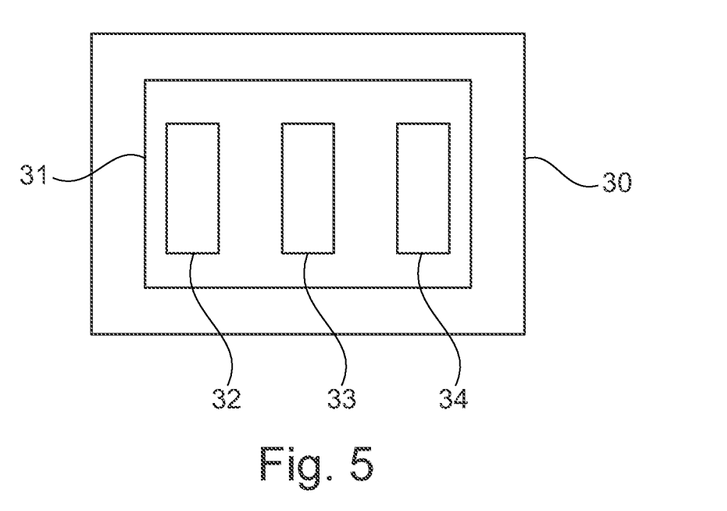
FIG. 5 schematically shows a lane change assistance apparatus according to the invention.

FIG. 5 schematically shows an example lane change assistance apparatus 30 which comprises an apparatus 31 for determining the driving of a first vehicle on a first road which is an on-ramp to a second road. The apparatus 31 comprises an apparatus 32 for determining the driving of the vehicle on a curve, an apparatus 43, for example a camera, for detecting an end of a road boundary of the road being driven on by the first vehicle from a second road and an apparatus 34 for detecting parallel and tangential traffic and is designed to carry out a method as disclosed herein.

Figure 6:
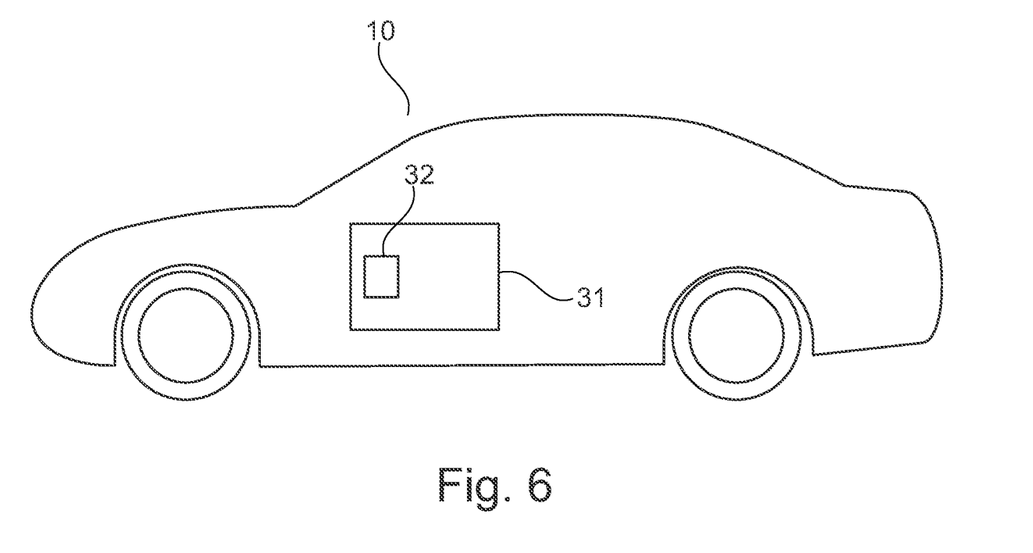
FIG. 6 schematically shows a motor vehicle according to the invention.

FIG. 6 schematically shows a motor vehicle 10. The motor vehicle 10 comprises an apparatus for determining the driving of the vehicle on an on-ramp to a second road 1. The apparatus 31 comprises an apparatus 32 for determining the driving of the motor vehicle 10 on a curve and is designed to carry out an above-described method. The apparatus 32 for determining the driving of the vehicle on a curve may comprise, for example, at least one yaw rate sensor and/or at least one sensor for determining the lateral acceleration of the vehicle and/or at least one steering angle sensor and/or at least one camera and/or a GPS.

The motor vehicle 10 also comprises a driver assistance apparatus which can be a lane change assistance apparatus 30 which has already been described. The lane change assistance apparatus 30 can be configured in such a manner that it adapts its functionality on the basis of the result of the determination of whether the motor vehicle 10 is driving on an on-ramp 3 and on the basis of the traffic situation on the road 1 onto which it is intended to drive. This can be carried out adaptively, for example. For example, the recommended speed and/or the size of a gap needed for merging between two vehicles driving behind one another on the second road 1 and/or at least one prerequisite for outputting a warning signal to the driver of the motor vehicle 10 can be adapted.

LIST OF REFERENCE SIGNS

1 Freeway
2 Lane
3 On-ramp
4 Guardrail
5 Guardrail
6 Meeting of the guardrails
7 Lane region
9 Direction of travel
9' Direction of travel
10 Motor vehicle
10' Motor vehicle
20 Vehicle
20' Vehicle
21 Direction of travel
21' Direction of travel
22 Direction of travel
23 Direction of travel
24 Side of the road
25 Side of the road
30 Lane change assistance apparatus
31 Apparatus for determining the driving of a first vehicle on an on-ramp
32 Apparatus for determining the driving of the vehicle on a curve
33 Apparatus for detecting an end of a road boundary
34 Apparatus for detecting parallel and tangential traffic
α Angle
β Angle
γ Angle

The invention claimed is:

1. A method, comprising:
determining, (a) a first vehicle is driving on a curve on a first road and, (b) by detecting a second road, a road boundary of the first road;
determining (c) parallel traffic by determining that a second vehicle is moving in a lane of the second road adjacent to the first road, and (d) tangential traffic by detecting a third vehicle is moving tangentially to the curve; and
determining that the first vehicle is driving on an on-ramp upon
  (i) simultaneously determining, at a first time, that the first vehicle is driving on the curve by detecting a first angle between the boundary of the first road and the boundary of the second road, and that there is tangential traffic by detecting a second angle between a direction of travel of the first vehicle and a direction of travel of the second vehicle, and further
  (ii) simultaneously determining, at a second time that is different than the first time, the end of the road boundary of the first road, and that there is the parallel traffic; and
activating a driver assistance function of the first vehicle upon determining that the first vehicle has reached the road boundary, the driver assistance function including to assist with a lane change or speed control.

2. The method of claim 1, wherein the second road is a multilane road.

3. The method of claim 1, wherein it is determined that the vehicle is driving on a right-hand curve in the case of right-hand traffic or is driving on a left-hand curve in the case of left-hand traffic.

4. The method of claim 1, wherein parallel or tangential traffic is detected using at least one optical sensor.

5. The method of claim 1, wherein tangential traffic is determined by determining an angle between a current direction of movement of the first vehicle and a current direction of movement of the at least one second vehicle is decreasing.

6. The method of claim 1, wherein to determine whether the vehicle is driving on the curve, at least one road boundary of the road being driven on by the first vehicle in the form of a guardrail or an edge of the road is detected and the curvature angle of the guardrail or of the edge of the road is determined.

7. The method of claim 1, wherein detecting the first angle between the boundary of the first road and the boundary of the second road includes detecting a change in the first angle over time.

8. An apparatus, comprising a device configured to:
determine (a) a first vehicle is driving on a curve on a first road or, (b) by detecting a second road, a road boundary of the first road;
determine (c) parallel traffic by determining that a second vehicle is moving in a lane of the second road adjacent to the first road, or (d) tangential traffic by detecting a third vehicle is moving tangentially to the curve;
determine that the first vehicle is driving on an on-ramp upon
  (i) simultaneously determining, at a first time, that the first vehicle is driving on the curve by detecting a first angle between the boundary of the first road and the boundary of the second road, and that there is tangential traffic by detecting a second angle between a direction of travel of the first vehicle and a direction of travel of the second vehicle, and further
  (ii) simultaneously determining, at a second time that is different than the first time, the end of the road boundary of the first road, and that there is the parallel traffic; and
activate a driver assistance function of the first vehicle upon determining that the first vehicle has reached the road boundary, the driver assistance function including to assist with a lane change or speed control.

9. The apparatus of claim 8, wherein the second road is a multilane road.

10. The apparatus of claim 8, the device further configured to determine that the vehicle is driving on a right-hand curve in the case of right-hand traffic or is driving on a left-hand curve in the case of left-hand traffic.

11. The apparatus of claim 8, the device further configured to determine that the first vehicle is driving on an on-ramp if the first road boundary of the first road and a second road boundary of the second road have been determined, wherein the first road boundary and the second road boundary enclose an acute angle at the end of the first road boundary.

12. The apparatus of claim 8, the device further configured to detect parallel or tangential traffic using at least one optical sensor.

13. The apparatus of claim 8, the device further configured to determine tangential traffic by determining an angle between a current direction of movement of the first vehicle and a current direction of movement of the at least one second vehicle is decreasing.

14. The apparatus of claim 8, wherein to determine whether the vehicle is driving on the curve, at least one road boundary of the road being driven on by the first vehicle in the form of a guardrail or an edge of the road is detected and the curvature angle of the guardrail or of the edge of the road is determined.

15. The apparatus of claim 8, wherein detecting the first angle between the boundary of the first road and the boundary of the second road includes detecting a change in the first angle over time.

* * * * *